May 6, 1952   A. ARATO   2,595,439
VARIABLE-SPEED TRANSMISSION MECHANISM
Filed Oct. 1, 1949   3 Sheets-Sheet 1

Inventor
Achille Arato
By Robert E. Burns
Attorney

May 6, 1952     A. ARATO     2,595,439

VARIABLE-SPEED TRANSMISSION MECHANISM

Filed Oct. 1, 1949     3 Sheets-Sheet 2

Inventor
Achille Arato
By Robert E. Burns
Attorney

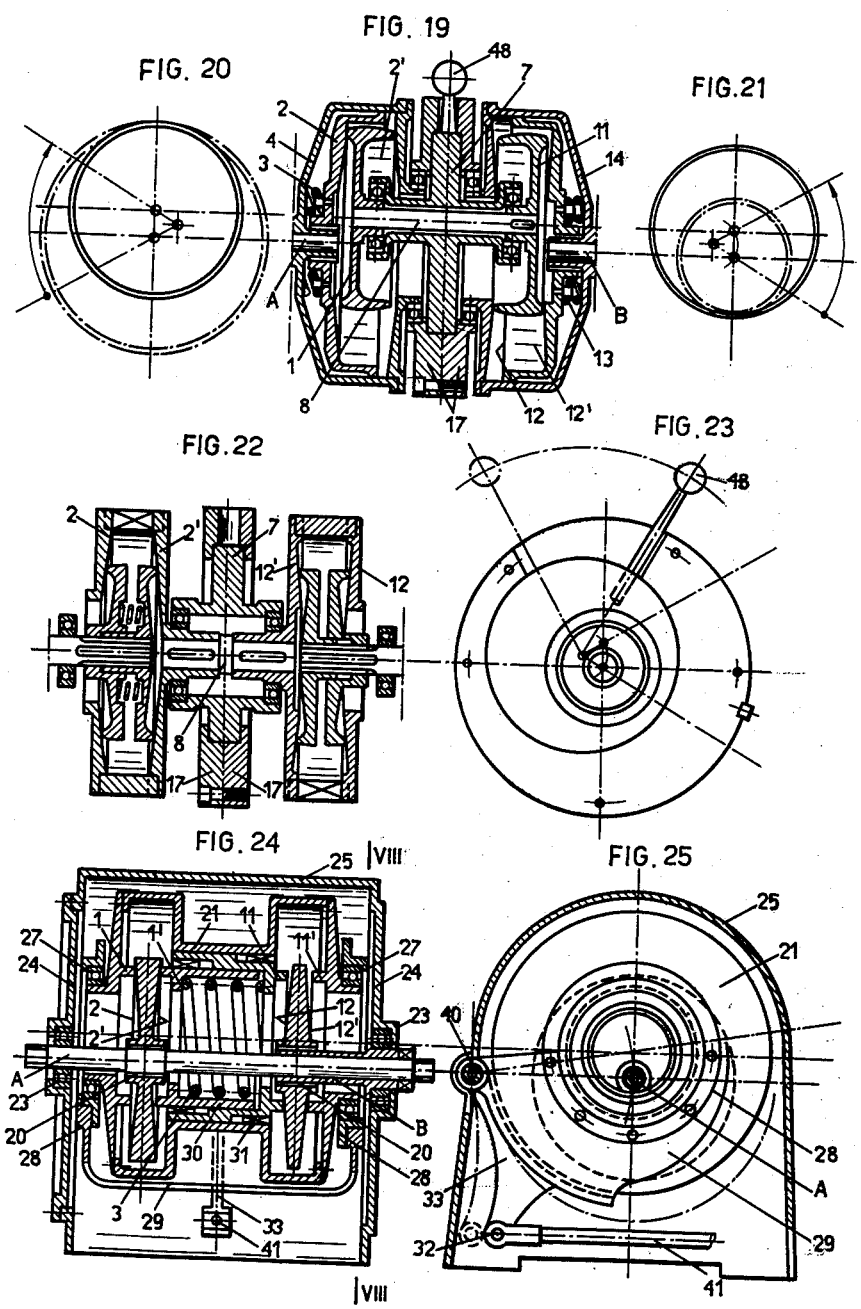

Patented May 6, 1952

2,595,439

UNITED STATES PATENT OFFICE 2,595,439

VARIABLE-SPEED TRANSMISSION MECHANISM

Achille Arato, Turin, Italy

Application October 1, 1949, Serial No. 119,025
In Italy October 16, 1948

1 Claim. (Cl. 74—199)

This invention relates to a variable speed transmission mechanism embodying friction surfaces by which the driving and driven shafts may be kept coaxial and adapted to operate at will as power multiplying or reducing gear depending upon which of said two shafts acts as driving shaft.

My improved variable speed transmission is tough in construction, reliable in working and durable since no axial thrusts are exerted on the bearings, and radial loads generated in operation on the bearings are much lower than the pressure required for transmission by friction.

It is known to employ variable friction transmission, consisting of a transmission disc and a wheel provided with an annular bead, having parallel axes and very slightly tapered conjugated friction surfaces, the taper amounting for instance to 2″. With these devices the transmission ratio is varied by the parallel displacement of one of the two axes with respect to the other, as the friction surfaces are pressed against each other.

These devices are objectionable inasmuch as they transmit to the thrust bearings almost the full reaction to the pressure applied for effecting transmission and do not admit of great variations in ratio, which would require the point of contact of the conjugated friction surfaces to be brought close to the centre of rotation, this implying overheating by sliding. The transmitted powers are in every instance objectionably limited.

My improved transmission obviates the abovementioned drawbacks and provides a variable speed transmission in which axial reaction thrusts are balanced and do not affect the bearings, and gradual change in speed may be effected over a wide range while the displacement between the conjugated surfaces is limited to a restricted region near the periphery over which sliding is lowest, which avoids overheating and allows of considerable powers being transmitted, while the driving and driven shaft may be maintained coaxial.

An object of this invention is to provide a variable speed transmission mechanism in which the slightly tapered conjugated cooperating surfaces of the beaded wheel and discs, respectively, are symmetrically arranged with respect to a middle plane, thereby doubling the friction region for transmission and annuling through a suitable connection any reaction on the bearings of the pressure between the friction surfaces required for transmission.

The conjugated surfaces of the beaded wheel and discs may be of a taper such as to form a surface projecting from the plane, which will be referred to as "convex" surface, or a re-entering surface which will be referred to as "concave" surface.

The parallel displacement of the disc shaft with respect to the shaft of the beaded wheel for removing it from the position in which both shafts are co-axial, entails in the former case a reduction in radius of the circumference of contact and in the latter case an increase in said circumference.

This principle which I have ascertained is applied in my improved transmission for coupling two units with convex and concave surfaces, respectively, whereby, the axial displacement being equal, the transmission ratio is double and the driving and driven shafts are kept co-axial, the displacement being confined to an intermediate shaft connecting the two units.

By doubling the transmission ratio the higher efficiency region of the friction surfaces is utilized.

Further details of my invention will be obvious from the appended specification, in which reference is made to the accompanying drawings which diagrammatically shows some constructions thereof.

Figures 17 to 25 show constructions of the variable speed transmission obtained by coupling two of the units shown in the preceding figures, said groups having concave and convex surfaces, respectively.

Figures 1, 2 and 3 show a unit in which the slightly tapered surfaces are concave and the beaded wheel is located therebetween, the pressure between the friction surfaces being given by a spring.

Figures 4, 5 and 6 are similar views, wherein the slightly tapered surfaces are convex.

Figures 7 and 8 show two modifications in which the beaded wheel is radially divided, the pressure spring being interposed between the two sections. The slightly tapered surfaces are concave in Figure 7 and convex in Figure 8 and are integral with a drum keyed to one of the shafts enclosing the beaded wheel mounted on the other shaft.

Figures 9 and 10 show another modification in which the two slightly tapered concave and convex surfaces, respectively, form the opposed faces of one disc which is located between the two parts of the beaded wheel.

Figures 11 and 12 show modifications of Figures 9 and 10, the annular beads being integral with a drum and the disc having slightly conical surfaces being located within the drum.

Figure 13 shows a modification of the construction shown in Figures 11 and 12 embodying an external drum carrying the annular beads and a divided disc with the slightly tapered surfaces having a spring interposed between the disc sections.

Figures 14 and 15 show modifications of the device shown in Figures 4 and 5.

Figure 16 shows a further modification, in which the springs act between the two sections of the drum carrying the beads and the slightly tapered surfaces are integral with a reel of which they form the internal surfaces of the disc-shaped portions or flanges.

Figure 17:
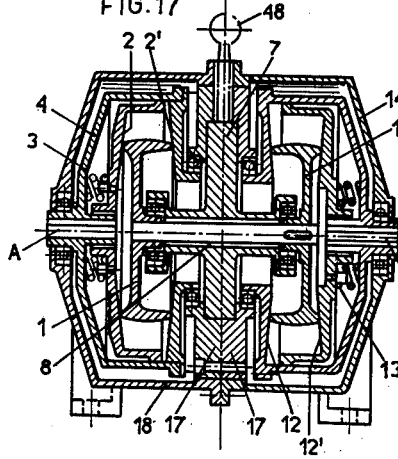

Figure 17 is an axial section of a construction of the variable speed transmissions with constantly coaxial driving and driven shafts, resulting from the coupling of two units with conical and convex surfaces, respectively, the two units being connected together by an intermediate shaft having mounted thereon the beaded wheels of said units and displaceable by the action of a central eccentric for varying the transmission ratio.

Figure 18:
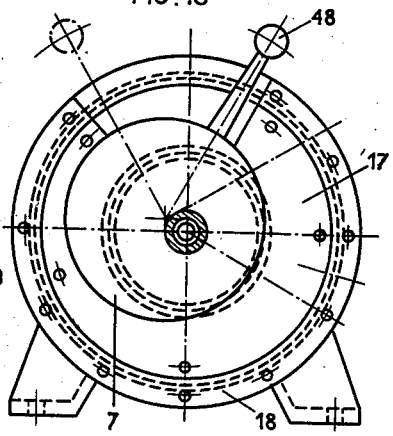

Figure 18 is a side view of the device shown in Figure 17, half of the casing and the mechanism therein enclosed being omitted to disclose the eccentric.

Figure 19 shows the same devices as Figure 17 under the greatest change in ratio.

Figures 20 and 21 show diagrammatically the contact circumferences of the units forming the device shown in Figures 17 to 19.

Figure 1:
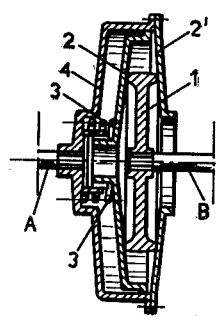
Figures 1 to 16 show the principle embodied by my transmission and construction of the change speed units with concave or convex surfaces.
Figure 4:
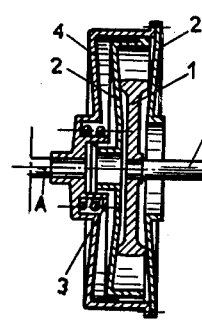
Figure 7:
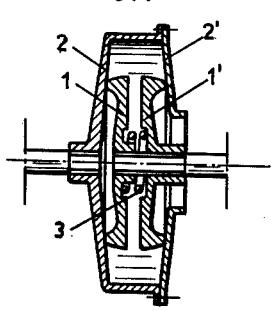
Figure 8:
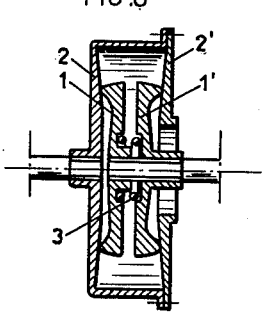

Figures 22 and 23 show a modification of Figure 17, in which the two units are of the type shown in Figures 7 and 8, instead of the type shown in Figures 1 and 4 as shown in Figure 17.

Figure 11:
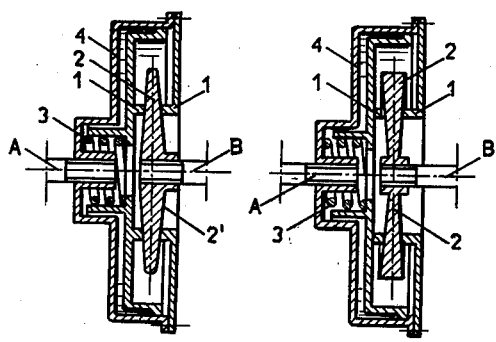
Figure 12:
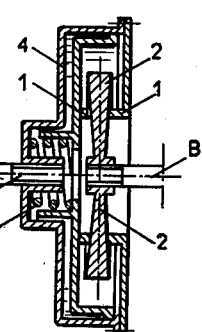
Figure 13:
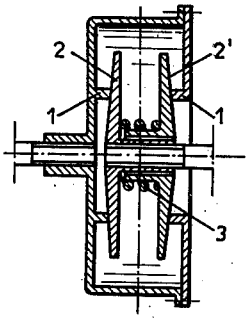
Figure 14:
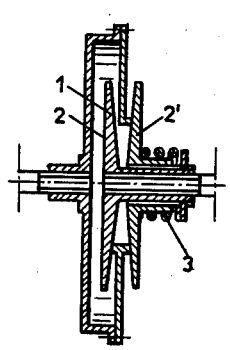
Figure 15:
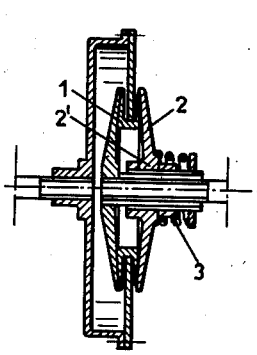
Figure 16:
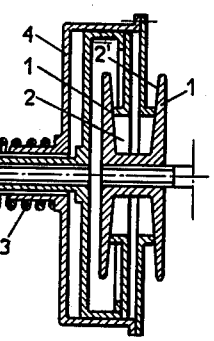

Figures 24 and 25 show in axial section and cross section on line XXV—XXV of Figure 24, respectively, of a variable transmission made up of two units with slightly conical convex and concave surfaces, respectively, of the type shown in Figures 11 and 12.

Figure 2:
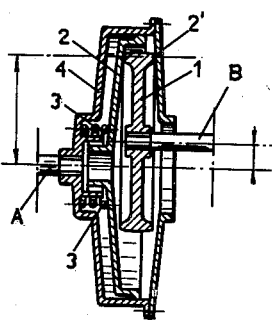
Figure 3:
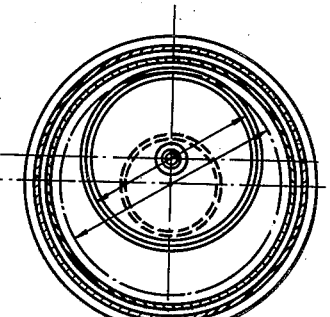

Referring to Figures 1 to 3, A and B denote the two shafts of the transmission; 2, 2' denote two discs which in the construction shown are formed with concave friction surfaces, enclosing therebetween the beaded wheel 1, of which the oppositely projecting beads are compressed against the concave surfaces of the discs 2, 2' under the action of spring 3 bearing on disc 2 and reacting on disc 4 which is connected at its periphery to the disc 2' thereby eliminating any axial thrust on the bearings.

Figure 5:
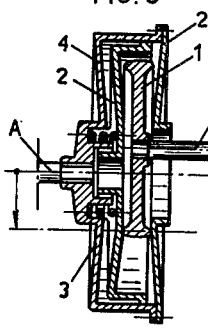
Figure 6:
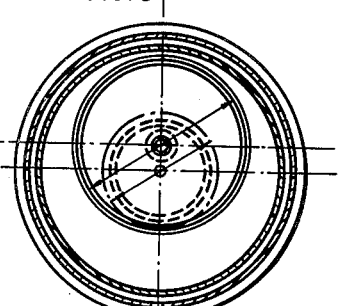

In the modification shown in Figures 4, 5 and 6 the discs 2, 2' are convex.

In the modification shown in Figures 7 and 8, the discs 2, 2' are rigidly coupled together forming a drum and the beaded wheel is radially divided into two symmetrical sections 1, 1' having a spring 3 interposed therebetween.

Figure 9:
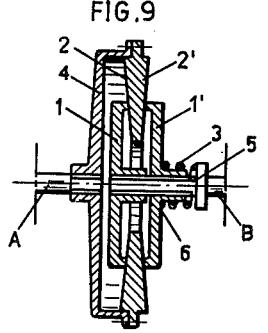
Figure 10:
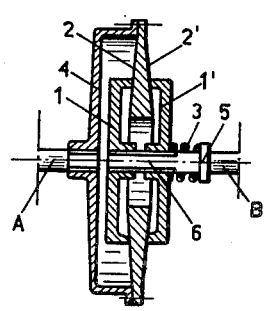

In the modification shown in Figures 9 and 10, the two slightly tapered concave and convex surfaces form the opposed faces 2, 2' of one disc keyed to one of the shafts by means of the cup-shaped member 4, while the beaded wheel is divided into two halves 1, 1' mounted on the other shaft and acting on opposed sides of the central discs.

The single central disc having surfaces 2, 2' is carried by the member 4 keyed to shaft A, and the section 1' of the beaded wheel is slidably mounted by splines 6 on the shaft B having fixed thereto the other section 1 of the same wheel.

The spring 3 acts between the section 1' and a collar 5 on the shaft B having the section 1 keyed thereto.

The devices shown in Figures 11 to 16 need not be described in detail, for they will be clearly understood from the above description of the devices from which they are derived, the same reference numerals being applied to similar parts.

Referring to Figures 17 to 21 which show the variable speed transmission made up of two units formed by the above described pairs of discs and beaded wheels with concave and convex surfaces, respectively, 2, 2' denote the two discs with concave surfaces of one unit, 1 is the central wheel beaded on both sides and cooperating with the discs; 12, 12' are the two discs of the other unit which differ from the first unit in that they are formed with convex instead of concave surfaces. 11 is the wheel beaded on both sides cooperating with discs 12, 12'.

4, 14 denote the discs keyed to the shafts A, B, respectively and connected to the discs 2', 12, respectively.

A row of helical springs 3, 13, respectively, transmit pressure between the surfaces of the discs and the beaded wheel of the two units without transmitting any axial thrust to the bearings.

The two beaded wheels 1, 11 are connected together by an intermediate shaft 8 rotatably mounted in lateral bearings on the eccentric 7 movable in a corresponding recess in the casing 17 formed by two symmetrical halves bolted together and carried by the likewise divided casing 18.

Operation of the eccentric by means of lever 48 will displace the shaft 8 and the two beaded wheels 1, 11 between the pairs of discs of the corresponding units. If the movement be directed from A toward B, the transmission ratio is multiplied, while if it be directed from B toward A it will be reduced. Both multiplying and reducing are due to the sum of the variations produced by each of the two units and occur without any axial thrust and with low components of the pressure between the friction surfaces on account of the small (about 2°) angle of taper of the friction surfaces.

In the modification shown in Figures 22 and 23, the connection of the two units is established by a pair of discs with concave and convex surfaces, respectively in the two units which are connected together by the intermediate shaft. The eccentric moves said disc pairs, while the beaded wheels interposed in each unit are radially divided and mounted on their respective shafts as indicated in the example shown in Figures 7 and 8, the pressure springs being interposed between the two halves.

Referring to the constructions shown in Figures 24 and 25, the variable speed transmission is formed by coupling the two units shown in Figures 11 and 12.

The discs having slightly concave and convex surfaces 2, 2' and 12, 12', respectively are slidably splined at 20 on the traversing driven shaft A and on the driving shaft B which is hollow and fitted on one end on the shaft A.

The transmission may thereby be attached at will on the same side or on opposite sides to the engine and driven apparatus, respectively. The drum 21 is provided with two outer annular beads 1, 11' on its front discs, while the inner beads 1', 11 are carried by sleeves 30, 31 slidably mounted within the drum and pressed by a spring 3 against the discs with slightly conical surfaces. The spring 3 may be replaced by a row of helical springs. The driven shaft A and driving shaft B are journalled on bearings 23 mounted in the side walls 24 of the casing 25 of the variable speed transmission.

The drum 21 has open ends through which extend the shafts A and B to enable the drum to be moved parallel to its axis with respect to said shaft in order to vary the transmission ratio.

The drum 21 is rotatably mounted on bearings 27 carried by rings 28 on the cradle 29 which may be oscillated about the pivot 40 carried by the casing 25. Power is transmitted through the link 41 pivoted at 32 to the arm 33 of the cradle 29.

When the variable transmission is used as reducing gear as assumed by employing as driven shaft the shaft A and as driving shaft the shaft B, the speed of the driven shaft A is reduced as the eccentricity of the axis of the drum carrying the annular beads to the axis of the shafts A and B increases, this resulting in an increase of the torque on shaft A. Since the spring or springs 3 acting on the inner beads of the gear are compressed as the eccentricity increases, the pressure transmitted by the springs between the friction surfaces increases with the torque on the driven shaft and with the tangential force to be transmitted.

What I claim is:

In a variable speed transmission mechanism a casing, a driving shaft and a driven shaft coaxial with the driving shaft, both of said shafts being rotatably mounted in said casing, a first variable friction transmitting means and a second variable friction transmitting means positioned inside the casing, the first variable friction transmitting means comprising a disc having radial externally slightly-tapered concave surfaces forming one element of the first variable friction transmitting unit fixed to the driving shaft and a beaded element having annular beads in frictional contact with said surfaces, the said second variable friction transmitting means comprising a disc having radial externally slightly-tapered convex surfaces forming one element of the second variable friction transmitting means fixed to the driven shaft and a beaded element having annular beads in frictional contact with said surfaces, the driving shaft being hollow and extending coaxially over the driven shaft, which extends through the device throughout its length, the annular beads of said beaded elements forming the other elements of the variable friction transmitting means cooperating on opposed sides with the slightly tapered surfaces of said two discs being carried by a drum which surrounds said discs and is adapted to be displaced radially with respect to the driving and driven shaft, elastic means for constantly urging the elements of each variable friction transmitting means together, and means for varying the ratios of the circles along which contact between the said conical surfaces and said beaded elements takes place whereby to vary the ratio of the mechanism.

ACHILLE ARATO.

REFERENCES CITED

The following references are of record in the file of this patent:

UNITED STATES PATENTS

| Number | Name | Date |
|---|---|---|
| 948,091 | Geer | Feb. 1, 1910 |

FOREIGN PATENTS

| Number | Country | Date |
|---|---|---|
| 23,945 | Great Britain | Oct. 16, 1913 |
| 163,264 | Germany | Sept. 23, 1905 |